(12) United States Patent
Jing

(10) Patent No.: US 11,388,959 B2
(45) Date of Patent: Jul. 19, 2022

(54) PET EYE SPLICE

(71) Applicant: R2P Group, Inc., Wichita, KS (US)

(72) Inventor: Xu Jing, Shanghai (CN)

(73) Assignee: COSMIC PET LLC, Wichita, KS (US)

( * ) Notice: Subject to any disclaimer, the term of this patent is extended or adjusted under 35 U.S.C. 154(b) by 0 days.

(21) Appl. No.: 16/691,044

(22) Filed: Nov. 21, 2019

(65) Prior Publication Data

US 2020/0163419 A1    May 28, 2020

Related U.S. Application Data

(60) Provisional application No. 62/771,719, filed on Nov. 27, 2018.

(51) Int. Cl.
| | | |
|---|---|---|
| *A44B 11/26* | (2006.01) | |
| *A01K 27/00* | (2006.01) | |
| *A44B 11/06* | (2006.01) | |

(52) U.S. Cl.
CPC .......... *A44B 11/266* (2013.01); *A01K 27/005* (2013.01); *A44B 11/065* (2013.01)

(58) Field of Classification Search
CPC ............. Y10T 24/45581; A44B 11/266; A44B 11/065; A01K 27/005
See application file for complete search history.

(56) References Cited

U.S. PATENT DOCUMENTS 5,309,610 A * 5/1994 le Gal .................. A44B 11/266
24/615

* cited by examiner

*Primary Examiner* — Robert Sandy
*Assistant Examiner* — Louis A Mercado
(74) *Attorney, Agent, or Firm* — Global IP Counselors, LLP

(57) ABSTRACT

A pet buckle includes a buckle body and a snap-fit member that can be inserted and fastened together, and a buckle cavity is disposed in the buckle body, the clip component is provided with an insertion section matched with the fastening cavity and is used for the belt adjusting portion of the webbing adjustment is characterized in that: a stretched extending piece is disposed on a bottom surface of the buckle body fastening cavity, and the extending piece extends to the card when the button body and the engaging member are fastened to each other. The strap adjustment portion of the connector presses the webbing of the strap adjustment portion.

7 Claims, 5 Drawing Sheets

PET EYE SPLICE

CROSS-REFERENCE TO RELATED PATENT APPLICATIONS

The present application is a non-provisional application claiming priority under 35 USC 119 filed on Nov. 27, 2018 by Xu Jing and entitled PET EYE SPLICE, the full disclosure of which is hereby incorporated by reference. The present application is related to China patent application CN20172370038U which was filed on Apr. 11, 2017 by Xu Jing and entitled Pet Eye Splice, which was published on Dec. 15, 2017 as publication number CN206744242, the full disclosure of which is hereby written by reference.

BACKGROUND

With the growing number of pet-raising families, the development of pet supplies has mushroomed. The market is currently filled with a variety of supplies developed for pets, such as pet leashes, vests, tents and so on. These items are related to some related safety accessories, and plastic buckles are one of the more common safety parts. At present, most of the pet buckles are connected by a snap connector (male buckle) that is engaged with the buckle body (mother buckle), and the buckle body is separated from the buckle body by pressing the two sides of the card connector. The clip is tripped. However, many users find that during the process of engaging the card connector and the button body, it is easy to cause the hair or skin of the pet to be squeezed, causing discomfort of the pet and forming a safety hazard. Therefore, those skilled in the art have been working to develop a pet safety buckle that is safer, more reliable, and simple in structure.

Figure 1:
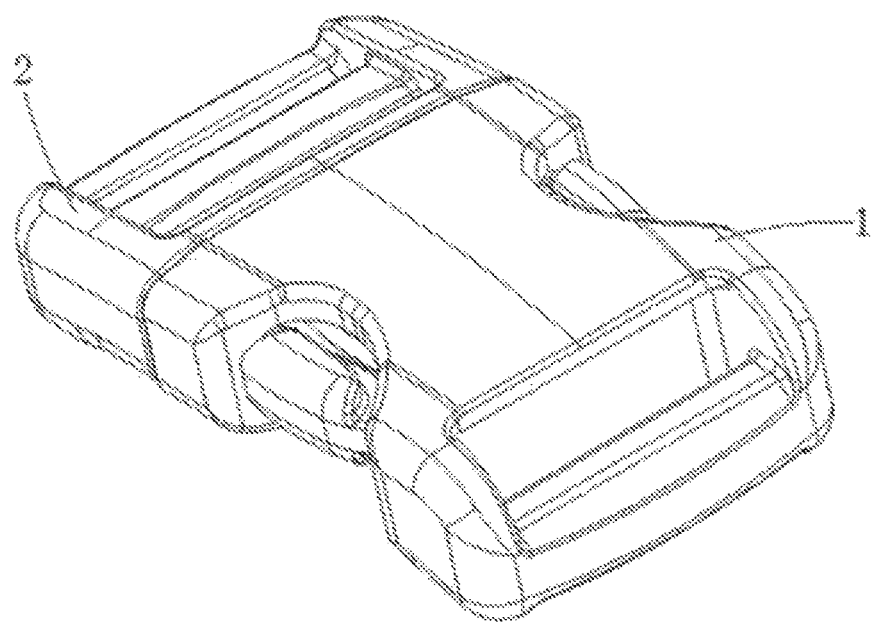
FIG. 1 is a perspective view of a preferred embodiment of the present invention.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

The technical problem to be solved by the present disclosure is to provide a pet buckle with simple structure, safety and reliability, which prevents the risk of pet hair, skin or pet clothes being stuck when the safety buckle is fastened, thereby achieving safety and protecting the pet, the goal of.

The present disclosure is implemented as follows, a pet buckle is provided, which comprises a buckle body and a snap-fit member which can be inserted and fastened together, and a buckle cavity is arranged in the buckle body, and the card connector is provided with the insertion portion of the fastening cavity and the strap adjustment portion for the adjustment of the webbing are provided with an extended extending piece on the bottom surface of the fastening body of the buckle body, when the fastening body and the fastening component are engaged with each other, the extension sheet extends to the webbing adjustment portion of the clip to press the webbing of the strap adjustment portion.

The effect of this embodiment is that the extension sheet effectively presses the adjustment webbing on the clip to achieve the effect of locking the webbing to prevent it from coming loose. In addition, the extension sheet also prevents the risk of pet hair/skin or pet clothes being stuck when the safety buckle is fastened, and reduces the discomfort of the pet when the buckle is worn, thereby achieving the purpose of safety and protection of the pet.

Further, the lacing adjustment portion includes a pressing rod and a lacing rod, the pressing rod is disposed at an end of the engaging member, the lacing rod is disposed at a side of the pressing rod, and the extension piece extends to the pressing rod Press the webbing under the pressure bar directly below it.

The effect of the embodiment is that, by the cooperation of the extension piece and the pressing bar, the webbing is further pressed between the extension piece and the pressing bar, thereby improving the effect of preventing the webbing from loosening of the extension piece.

Further, an extension groove is disposed at a lower portion of the clip, the width of the extension groove is greater than a width of the extension piece, and the extension piece and the extension are extended when the button body and the card member are engaged with each other A gap is left between the bottom surfaces of the grooves for the webbing to pass.

The effect of this embodiment is that the webbing is pressed into the gap between the extension sheet and the extension groove, and the choice of the gap size will affect the amount of pressing force of the extension sheet on the webbing.

Further, the insertion section includes two bendable pins and a guide bar, and the two pins are respectively disposed on both sides of the guide bar.

The effect of the embodiment is that the two pins are provided for engaging with the buckle body in order to enhance the stability when the card connector is inserted into the buckle body, and the guide bar provides a guiding function for the card connector to be inserted into the buckle body.

Further, at the top of the pin, a fastening rod is disposed, and each of the pins is respectively provided with a foot link and an elastic rod, and one ends of the foot link and the elastic rod are respectively connected with the body of the clip. The other end of the pin is gradually brought together at the top of the pin, and the leg link is provided with a pressing portion which is raised up and down and higher than the foot link and the elastic bar.

The effect of the embodiment is that the buckle lever is one of the important components for the card member to be engaged with the fastener, the buckle bar is disposed at the top of the pin to facilitate the release of the card member, and the pressing portion is provided to indicate the card connector. It is unlocked by pressing the pin.

Further, guide grooves are respectively provided on the upper and lower sides of the guide bar.

The effect of this embodiment is that the guiding action of the guide rod is achieved by means of a guide groove provided.

Further, a partitioning piece is disposed on the top side wall and/or the bottom side wall of the fastening cavity, and the partitioning piece and the guiding groove of the engaging member cooperate with each other.

The effect of this embodiment is that the guide bar is guided by the separator so that the clip is smoothly inserted into the buckle body.

Further, a fastening piece and a fastening hole are respectively disposed on the top side wall and the bottom side wall of the fastening cavity, and the fastening piece is located on two sides of the separation piece, and the fastening rod of the fastening component is mutually Cooperate.

The effect of the embodiment is that the mutual spacing of the two fastening pieces is slightly smaller than the spacing between the fastening rods of the two pins, and when the buckle body and the fastening piece are engaged with each other, the fastening rod the fastening piece is guided into the fastening hole.

Further, an inwardly concave slit is respectively provided at both side portions of the buckle body, and the slit is engaged with the pressing portion of the clip.

The effect of the embodiment is that when the button body and the clip member are engaged with each other, the slit can catch the pressing portion to prevent the clip from being loosened. When the pressing portion is pressed by hand, the pin is bent inward, the pressing portion is moved inwardly out of the slit, and the engaging rod is also disengaged from the engaging hole, and the engaging member is smoothly separated from the buckle body.

Compared with the prior art, the pet buckle of the present invention has a stretched extension piece on the bottom surface of the buckle body, and when the card connector of the pet webbing has been caught in the buckle body with the extension piece, the extension piece will catch the corresponding webbing on the clip to prevent the webbing from slipping (no matter what angle) and locking effect. In addition, the extension of the bottom of the button body also prevents the risk of pet hair, skin or pet clothes getting stuck when the safety buckle is engaged, thereby achieving the purpose of safety and protection of the pet.

In order to make the technical problems, technical solutions and beneficial effects to be solved by the present invention more clearly, the present invention will be further described in detail below with reference to the accompanying drawings and embodiments. It is understood that the specific embodiments described herein are merely illustrative of the invention and are not intended to limit the invention.

Figure 2:
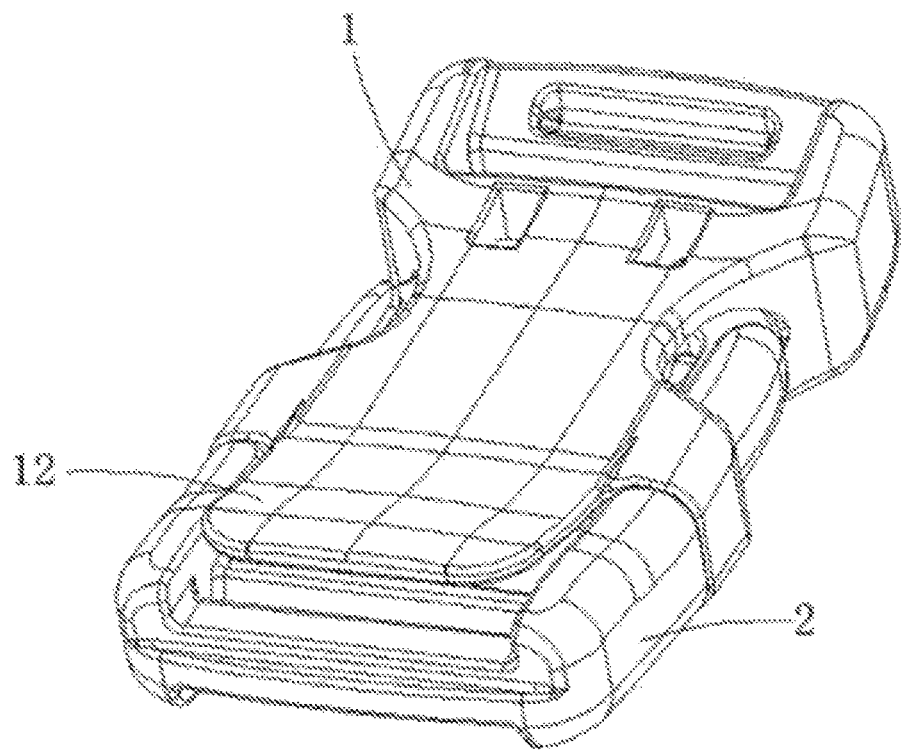
FIG. 2 is a perspective view showing another angle of the embodiment of FIG. 1.
Figure 3:
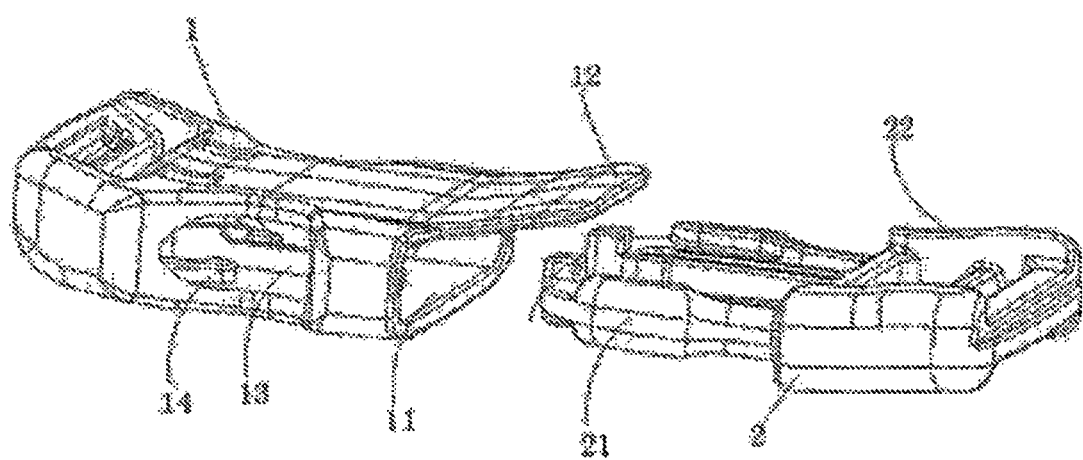
FIG. 3 is a schematic view showing the buckle body and the snap fastener of FIG. 1 interlocking with each other.
Figure 4:
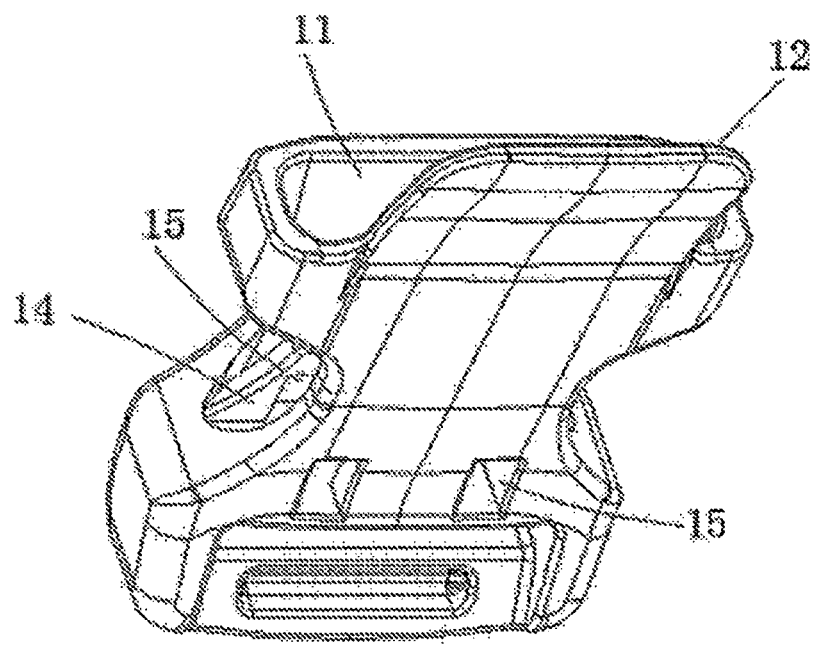
FIG. 4 is a perspective view of the buckle body of FIG. 3.
Figure 5:
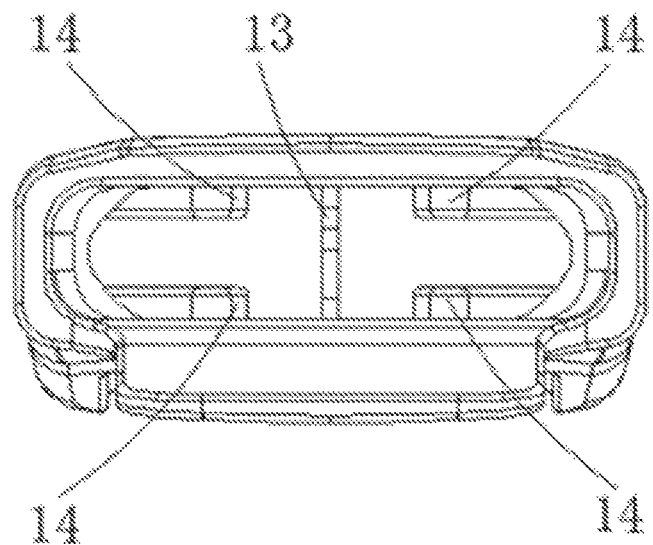
FIG. 5 is a front elevational view of the button body of FIG. 4.
Figure 6:
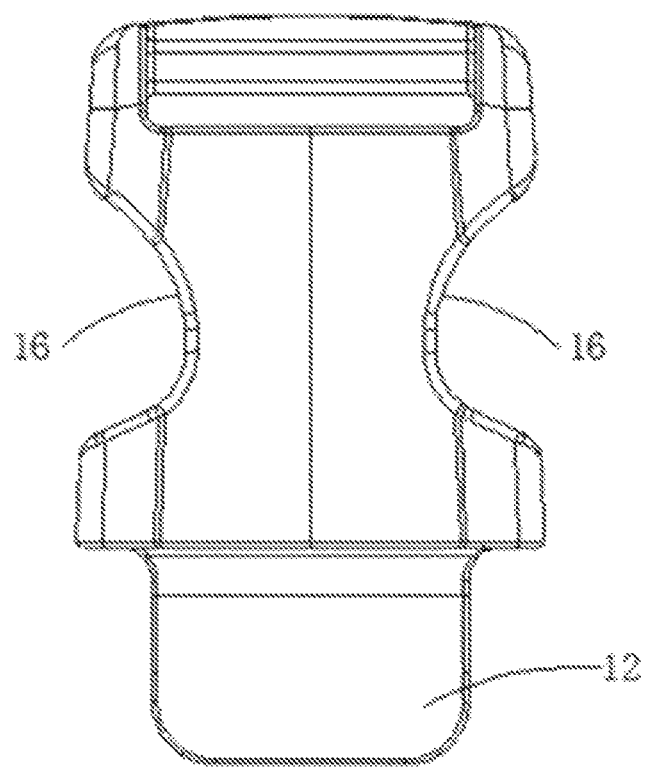
FIG. 6 is a plan view of FIG. 5.
Figure 7:
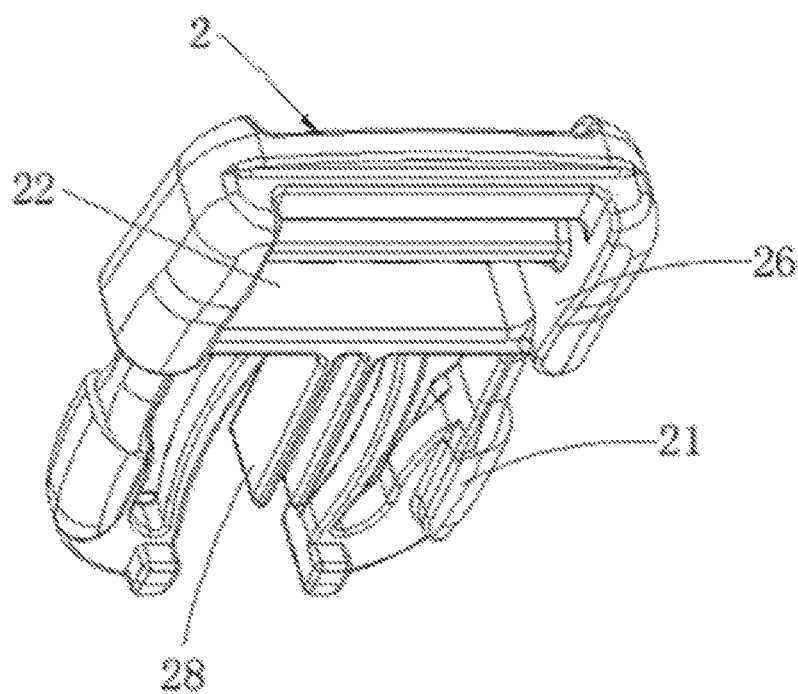
FIG. 7 is a perspective view of the clip of FIG. 3.
Figure 8:
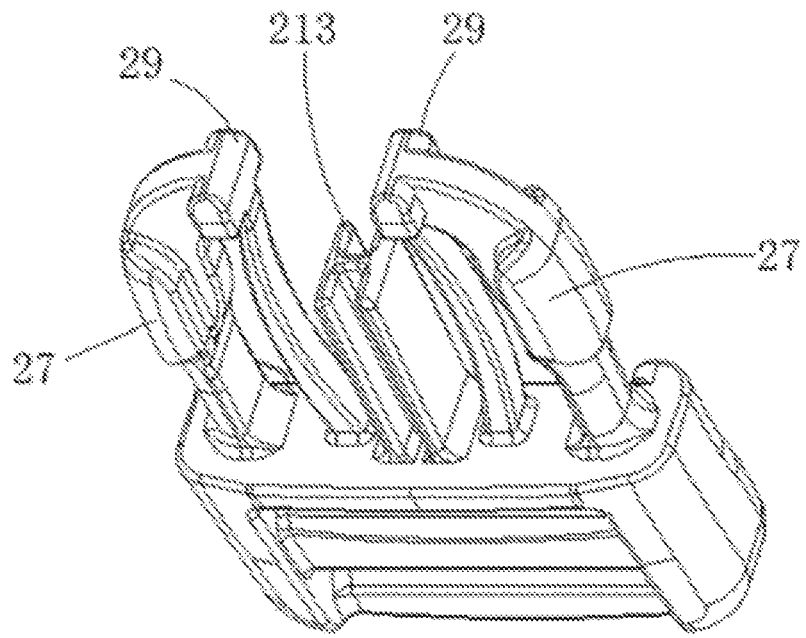
FIG. 8 is a perspective view showing another angle of the clip of FIG. 7.
Figure 9:
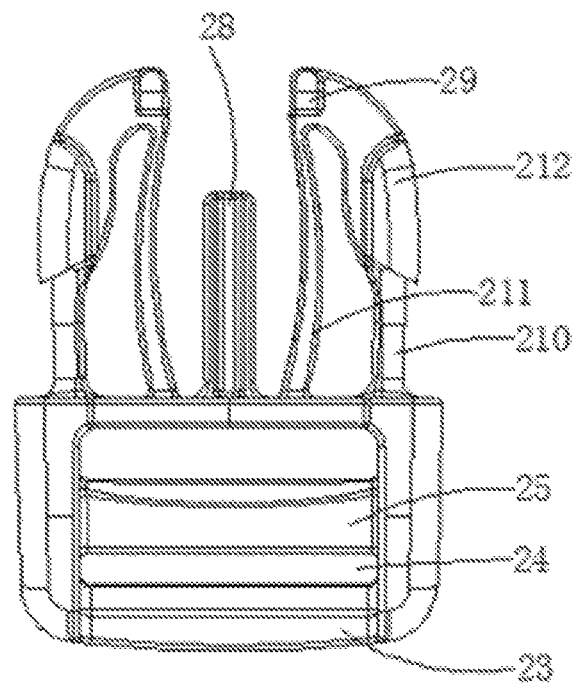
FIG. 9 is a front elevational view of the clip of FIG. 3.
Figure 10:
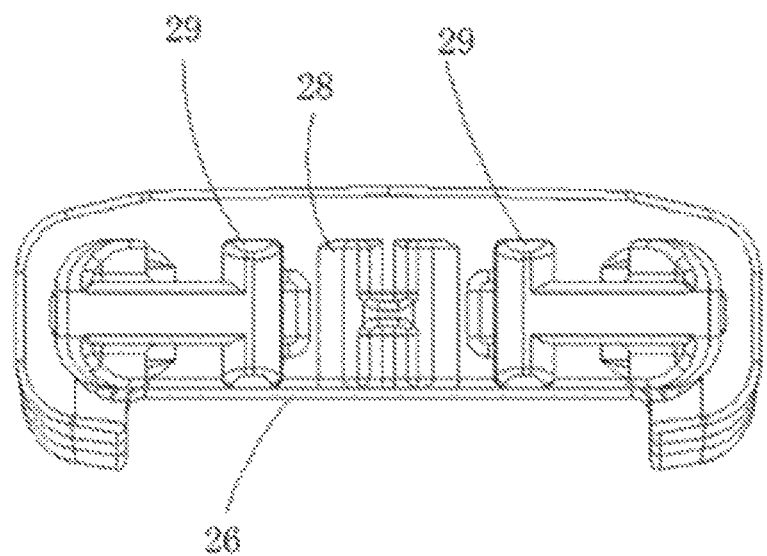
FIG. 10 is a plan view of FIG. 9.

Referring to FIG. 1, FIG. 2 and FIG. 3, a preferred embodiment of the pet buckle of the present invention includes a buckle body 1 and a clip member 2 that can be inserted and fastened together.

A fastening cavity 11 is provided in the buckle body 1. The clip 2 is provided with an insertion section 21 that cooperates with the fastening cavity 11 and a strap adjustment portion 22 for webbing adjustment. The insertion section 21 and the strap adjusting portion 22 are respectively located at both ends of the clip 2. An extended extension piece 12 is disposed on a bottom surface of the buckle body fastening cavity 11. When the buckle body 1 and the clip member 2 are fastened to each other, the extension of the extension piece 12 to the component clip member 2 is adjusted. The portion 22 presses the webbing of the strap adjusting portion 22.

Referring to FIG. 7, FIG. 8, FIG. 9 and FIG. 10 simultaneously, the strap adjusting portion 22 includes the pressing rod 23, a lacing rod 24, and a wearing hole 25. The pressing rod 23 is disposed at an end of the clip member 2, the lacing rod 24 is disposed at a side of the pressing rod 23, and the extension piece 12 extends below the pressing rod 23 and is pressed under the pressing rod 23 Ribbon. The webbing (tape) is wound around the lacing rod 24 through the wearing hole 25, and both ends of the webbing are pressed by the pressing rod 23.

An extension groove 26 is provided at a lower portion of the clip member 2. The width of the extension groove 26 is greater than the width of the extension piece 12. When the buckle body 1 and the clip member 2 are engaged with each other, a gap is left between the extension piece 12 and the bottom surface of the extension groove 26 for the webbing to pass.

The insertion section 21 includes two bendable pins 27 and a guide bar 28. Two of the pins 27 are respectively disposed on both sides of the guide bar 28. In the present embodiment, the guide bars 28 are disposed on the central axis of the buckle, and the two pins 27 are bilaterally symmetrical.

A fastening rod 29 is provided at the top of the pin 27. A foot link 210 and an elastic rod 211 are respectively disposed on each of the pins 27, and one end of the foot link 210 and the elastic rod 211 are respectively connected to the body of the clip member 2, and the other end is at the top of the pin 27. Gradually brought together. A pressing portion 212 is provided on the foot link 210. The fastening rod 29 is raised above and below and is higher than the foot link 210 and the elastic rod 211. The pin 27 is provided with a double leg, which increases the resilience while ensuring the strength thereof, and improves the stability of the buckle.

Guide grooves 213 are respectively provided on the upper and lower sides of the guide bar 28.

Referring to FIG. 4, FIG. 5, FIG. 6 and FIG. 7, a partition piece 12 is disposed on the top wall and/or the bottom side wall of the fastening cavity 11, and the partition piece 13 and the clip member 2 are disposed on the top side wall and/or the bottom side wall of the fastening cavity 11. The guide grooves 213 are fitted to each other. In the present embodiment, partition piece 13 is provided only on the top side wall. In fact, the partition piece 13 can also be arranged on the bottom side wall or on both the top side wall and the bottom side wall. These embodiments are all within the scope of the present invention.

A fastening piece 14 and a fastening hole 15 are respectively disposed on the top side wall and the bottom side wall of the fastening cavity 11. The fastening piece 14 is located on both sides of the partitioning piece 13 and cooperates with the fastening rod 29 of the clip member 2. The mutual spacing of the two fastening pieces 14 is slightly smaller than the spacing between the fastening rods 29 and the two pins 27, and when the buckle body 1 and the clip member 2 are engaged with each other, the fastening rod 29 is fastened. The sheet fastening piece 14 is guided into the fastening hole 15.

Inwardly concave slits 16 are respectively provided at both side portions of the buckle body 1. The slit 16 is engaged with the pressing portion 212 of the clip 2.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A pet buckle including a buckle body and a clip member that can be inserted and fastened together, and a fastening cavity is disposed in the buckle body, and the clip member is provided with an insertion section matched with the fastening cavity and is used for a belt adjusting portion of a webbing adjustment is characterized in that an extension piece is disposed on a bottom surface of the buckle body, and the extension piece extends to a strap adjustment portion of the clip member when the buckle body and the clip member are fastened to each other and presses the webbing on the strap adjustment portion;

wherein said insertion section comprises two bendable pins and a guide bar, and said two pins are respectively disposed on both sides of the guide bar; and wherein a fastening rod is disposed at a top of the pin, and a foot link and an elastic rod are respectively disposed on each of the pins, the foot link and one end of the elastic rod is respectively connected with a body of the clip member, and the other end is gradually brought together at the top of the pin, the foot link is provided with a pressing portion, and the pressing portion is raised up and down and higher than the foot link and the elastic rod.

2. The pet buckle according to claim 1, wherein a guide groove is provided on each of an upper and lower sides of the guide bar.

3. The pet buckle according to claim 2, wherein a partition piece is disposed on a top side wall and/or a bottom side wall of the fastening cavity, and the partition piece and the guide groove of the clip member cooperate with each other.

4. The pet buckle according to claim 1, wherein a fastening piece and a fastening hole are respectively disposed on a top side wall and a bottom side wall of the fastening cavity, and the fastening piece is located on two sides of a partition piece side, and cooperate with the fastening rod of the clip member.

5. The pet buckle according to claim 1, wherein an inwardly concave slit is provided at each of both side portions of the buckle body, and the slit is engaged with the pressing portion of the clip member.

6. The pet buckle according to claim 1, wherein the strap adjustment portion comprises a pressing rod and a lacing rod, said pressing rod being disposed at an end of clip member, said lacing rod being disposed at a side of the pressing rod, the extension piece extends directly below the pressing rod to press the webbing underneath the pressing rod.

7. The pet buckle according to claim 1, wherein an extension groove is disposed at a lower portion of the clip member, a width of the extension groove is smaller than a width of the clip member, the width of the extension groove is larger than a width of the extension piece, and when the buckle body and the clip member are fastened to each other, a gap is left between the extension piece and a bottom surface of the extension groove for the webbing to pass.

* * * * *